United States Patent
Wiederkehr et al.

(10) Patent No.: US 9,291,485 B2
(45) Date of Patent: Mar. 22, 2016

(54) SENSOR MODULE MEASURING AND/OR MONITORING PARAMETERS OF MEDIA FLOWING IN PIPELINES AND MEASURING SYSTEM FORMED THEREWITH

(75) Inventors: Dominique Wiederkehr, Hagenthal-le-bas (FR); Andreas Strub, Aesch (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 14/237,960

(22) PCT Filed: Jul. 17, 2012

(86) PCT No.: PCT/EP2012/064012
§ 371 (c)(1),
(2), (4) Date: Feb. 10, 2014

(87) PCT Pub. No.: WO2013/023859
PCT Pub. Date: Feb. 21, 2013

(65) Prior Publication Data
US 2014/0174197 A1 Jun. 26, 2014

(30) Foreign Application Priority Data
Aug. 12, 2011 (DE) .......................... 10 2011 080 894

(51) Int. Cl.
*G01F 1/32* (2006.01)
*G01F 5/00* (2006.01)

(52) U.S. Cl.
CPC .............. *G01F 1/3218* (2013.01); *G01F 5/005* (2013.01)

(58) Field of Classification Search
CPC ................ G01F 1/32; G01F 1/86; G01F 1/68
USPC .................. 73/861.24, 861.22, 204.22, 202.5
See application file for complete search history.

(56) References Cited

U.S. PATENT DOCUMENTS

| | | | |
|---|---|---|---|
| 4,325,262 A | 4/1982 | Meisser | |
| 4,716,770 A * | 1/1988 | Herzog | G01P 5/01 73/861.24 |
| 5,152,181 A * | 10/1992 | Lew | G01F 1/3218 73/861.02 |
| 5,214,965 A * | 6/1993 | Lew | G01F 1/86 73/861.24 |
| 6,070,462 A * | 6/2000 | Igarashi | F02D 41/187 73/114.34 |
| 6,220,090 B1 | 4/2001 | Kohno | |
| 6,840,102 B2 | 1/2005 | Kouno | |
| 6,945,105 B2 * | 9/2005 | Pesahl | G01F 5/00 73/204.22 |
| 7,007,556 B2 | 3/2006 | Keita | |
| 7,401,509 B2 * | 7/2008 | Konzelmann | G01F 1/6842 73/202.5 |

FOREIGN PATENT DOCUMENTS

| | | |
|---|---|---|
| CN | 1692273 A | 11/2005 |
| DE | 2549619 | 5/1977 |
| DE | 2924561 | 7/1980 |
| DE | 10306805 A1 | 10/2003 |
| DE | 10240189 | 3/2004 |
| EP | 0897101 A1 | 2/1999 |
| EP | 0940657 A2 | 9/1999 |
| JP | 62285022 | 12/1987 |
| JP | 201085136 A | 4/2010 |
| WO | 2004025227 A1 | 3/2004 |

OTHER PUBLICATIONS

German Search Report, German PTO, Munich, Germany Jun. 6, 2012.
International Search Report, EPO, The Netherlands, Oct. 23, 2012.
English translation of IPR, WIPO, Geneva, Feb. 27, 2014.
Office Action, Chinese State Intellectual Property Office, Beijing, China, May 28, 2015 (English translation of Office Action included).

* cited by examiner

*Primary Examiner* — Jewel V Thompson
(74) *Attorney, Agent, or Firm* — Bacon & Thomas, PLLC

(57) ABSTRACT

A sensor module serves for registering a flow velocity and/or a volume flow rate, of a fluid flowing in a pipeline. The sensor module comprises a platform ($P_S$) having, extending therein from an inlet opening to a drain opening remote therefrom and communicating with the lumen of the pipeline, a flow path for guiding a fluid volume portion branched from the fluid flowing in the pipeline and a transducer element for producing at least one sensor signal influenced by the fluid guided in the flow path. The flow path is additionally so embodied that an imaginary central axis ($L_B$) of the intermediate region is not parallel to an imaginary central axis of the intake region and/or not parallel to an imaginary central axis of the drain region.

30 Claims, 2 Drawing Sheets

SENSOR MODULE MEASURING AND/OR MONITORING PARAMETERS OF MEDIA FLOWING IN PIPELINES AND MEASURING SYSTEM FORMED THEREWITH

TECHNICAL FIELD

The invention relates to a sensor module insertable externally into a pipeline for registering at least one parameter, especially a flow velocity and/or a volume flow rate, of a fluid flowing in the pipeline. Furthermore, the invention relates to a measuring system formed with such a sensor module for ascertaining at least one parameter, especially a flow velocity and/or a volume flow rate, of a flowing fluid.

BACKGROUND DISCUSSION

Often used in process measurement and automation technology for measuring flow velocities, respectively volume, or mass, flow rates corresponding to the flow velocity (u), of fluids flowing in pipelines, especially rapidly flowing, and/or hot, gases and/or fluid flows of high Reynolds number (Re), are measuring systems embodied as vortex flow measuring devices. Examples of such measuring systems are known from, among others, Japanese Patent JP-A 2005227115, Japanese Patent JP-A 9196720, U.S. Pat. No. 3,587,312, U.S. Pat. No. 4,562,745, U.S. Pat. No. 5,463,904, U.S. Pat. No. 6,101,885, U.S. Pat. No. 6,298,734, U.S. Pat. No. 6,752,027 and U.S. Pat. No. 7,073,394. These disclosed measuring systems each have a bluff body protruding into the lumen of the respective pipeline, consequently flowed against by the fluid, for producing vortices lined up in a so-called Karman vortex street in the volume portion of the fluid flow flowing directly downstream from the bluff body. The vortices are, as is known, generated on the bluff body with a shedding rate ($1/f_{Vtx}$) dependent on the flow velocity and ideally proportional to the flow velocity. Furthermore, the measuring system includes, integrated in the bluff body, respectively associated therewith or located downstream therefrom, namely in the region of the Karman vortex street and protruding into the flow, a transducer element. The transducer element—most often embodied with paddle shape—serves to produce a sensor signal, which corresponds to pressure reigning within the fluid and exhibiting, as a result of the Karman vortices, periodic fluctuations, consequently a signal frequency ($\sim f_{Vtx}$) corresponding to the shedding rate of the vortices. According to this, prerequisites for the desired proportionality of flow velocity and vortex shedding rate—described, as is known, via the Strouhal number ($St \sim f_{Vtx}/u$)—are an as high as possible Reynolds number of above 20000 as well as an initially as undisturbed as possible, steady, flow profile in the region directly before the bluff body. Thus, for measuring systems of the aforementioned type, usually approach lengths of more than 10 times the nominal diameter of the pipeline are recommended.

For pipelines of large nominal diameter, namely DN 100 (inner diameter=100 mm) or larger, because of the otherwise very complicated bluff body, frequently so-called "insertion type", vortex, flow measuring devices are used, namely measuring systems of the aforementioned type, in the case of which, such as, for example, also shown in the already mentioned JP-A 2005227115, JP-A 9196720, U.S. Pat. No. 4,562,745, respectively U.S. Pat. No. 6,752,027, bluff body and transducer element are integrated together in a sensor module insertable externally through the pipe wall of the pipeline, consequently a sensor module built essentially shorter than the nominal diameter. The sensor module is, furthermore, connected with an electronics module—most often an electronics module releasably connected therewith and/or encapsulated pressure and shock resistantly, in given cases, also outwardly hermetically sealed. Electronics modules for industrially usable measuring systems have usually, electrically connected with the transducer element via connecting lines, in given cases, with interposing electrical barriers and/or galvanic separation locations, a corresponding transmitter electronics for processing the at least one sensor signal produced by the transducer element and for producing digital measured values for the respectively to be registered, measured variable, namely flow velocity, volume flow rate and/or mass flow rate. The transmitter electronics, which is usually accommodated in an electronics housing of metal and/or shock resistant, synthetic material for industrially usable measuring systems, respectively measuring systems established in industrial measurements technology, includes additionally most often also standard, external interfaces embodied, for example, as two conductor connections, respectively as interfaces compatible with established fieldbusses, for communication with superordinated measuring and/or control systems formed, for example, by means of programmable logic controllers (PLC).

In order, in the case of such measuring systems depending most often still more on undisturbed and steady, consequently largely determined, flow profiles, combined with as short as possible approach length, to be able to achieve a sufficient accuracy of measurement, there is integrated in their respective sensor modules, at times, supplementally, a flow conditioner, for instance, in the form of a straight tube providing a defined flow path and having a smaller caliber than the pipeline. The tube is aligned with the pipeline, and the bluff body and the transducer element are placed, in the lumen of the tube.

A disadvantage of conventional "insertion type", vortex, flow measuring devices is that, because of the desired short approach length, on the one hand, and because of the bore most often having standard dimensions, on the other hand, always a compromise must be made between the effectiveness of the flow conditioner, respectively the installed dimensions of the sensor module influencing this, not least of all, however, installed dimensions predetermined by the bore, and the accuracy of measurement actually achievable for the flow measuring device formed by means of the respective sensor module.

SUMMARY OF THE INVENTION

Proceeding from the above traced state of the art, an object of the invention is to improve the construction of sensor modules for "insertion type" flow measuring devices, especially also for "insertion type", vortex, flow measuring devices and/or for pipelines with nominal diameters of more than 100 mm, that therewith also in the case of short approach lengths of less than 10 times the nominal diameter of the pipeline, measured values for flow velocities, respectively for volume or mass, flow rates can be obtained over an as large as possible measuring range well reproducibly with a measurement accuracy of over 99%, respectively a measuring error of less than 1%.

For achieving the noted object, the invention resides in a sensor module for registering at least one parameter, for example, a flow velocity and/or a volume flow rate, of a fluid flowing in a pipeline. The sensor module of the invention comprises, placed in a lumen of the pipeline and shaped, for example, prismatoidally (namely having the shape of a prismatoid) or cylindrically, a platform having, extending therein from an inlet opening to a drain opening remote therefrom and communicating with the lumen of the pipeline, a flow path for guiding a fluid volume portion branched from the fluid flowing in the pipeline, as well as, arranged on the flow path, for example, protruding at least partially into such, a transducer element for producing at least one sensor signal influenced by the fluid guided in the flow path. The flow path of the sensor module of the invention includes an intake region connected with the inlet opening, for example, an intake region having a circularly cylindrical lumen, a drain region connected with the drain opening, for example, a drain region having a circularly cylindrical lumen, as well as a straight, intermediate region communicating with the intake region and the drain region, for example, an intermediate region having a circularly cylindrical lumen, and so embodied that an imaginary central axis of the intermediate region is not parallel, for example, it is perpendicular, to an imaginary central axis of the intake region and/or it is not parallel, for example, it is perpendicular, to an imaginary central axis of the drain region.

According to a first embodiment of the invention, it is, furthermore, provided that the flow path has a largest inner diameter, which is less than a smallest inner diameter of the pipeline. This, especially, in such a manner that a diameter ratio, defined by a ratio of the largest inner diameter of the flow path to the smallest inner diameter of the pipeline is less than 0.2, for example, less than 0.1.

According to a second embodiment of the invention, it is, furthermore, provided that the imaginary central axis of the intake region is parallel to the imaginary central axis of the drain region.

According to a third embodiment of the invention, it is, furthermore, provided that the imaginary central axis of the intake region extends not parallel, for example, it is perpendicular, to the imaginary central axis of the drain region.

According to a fourth embodiment of the invention, it is, furthermore, provided that the intake region is funnel shaped.

According to a fifth embodiment of the invention, it is, furthermore, provided that the drain region is funnel shaped.

According to a sixth embodiment of the invention, it is, furthermore, provided that the inlet opening is placed on a first side of the platform, for example, a first side flowed perpendicularly against by the fluid and/or acting as a strike surface for approaching fluid, and wherein the drain opening is placed on a second side of the platform arranged downstream relative to said first side.

According to a seventh embodiment of the invention, it is, furthermore, provided that a pipeline section surrounding the lumen accommodating the platform is circularly cylindrical and/or formed by means of a straight tube. Developing this embodiment of the invention further, it is, furthermore, provided that the imaginary central axis of the drain region is parallel to the imaginary central axis of said pipeline section. The flow path can, however, in case required, also be so embodied that the imaginary central axis of the drain region extends not parallel, for example, also perpendicular, to the imaginary central axis of said pipeline section. Alternatively or in supplementation, the flow path can, for example, also be so embodied that the imaginary central axis of the intermediate region of the flow path is not parallel, for example, it is perpendicular, to an imaginary central axis of the said pipeline section.

According to an eighth embodiment of the invention, it is, furthermore, provided that a pipeline section surrounding the lumen accommodating the platform is circularly cylindrical and/or formed by means of a straight tube and that an imaginary central axis of the intermediate region of the flow path is not parallel, for example, it is perpendicular, to an imaginary central axis of the said pipeline section. Developing this embodiment of the invention further, it is, additionally, provided that the inlet opening has a radial separation from the imaginary central axis of said pipeline section, which is different from a radial separation, which the drain opening has from the imaginary central axis of said pipeline section; this being the case e.g. also in such a manner that the inlet opening has a radial separation from the imaginary central axis of said pipeline section, which is smaller than a radial separation, which the drain opening has from the imaginary central axis of said pipeline section; and/or that the imaginary central axis of the intake region is parallel to the imaginary central axis of said pipeline section.

According to a ninth embodiment of the invention, it is, furthermore, provided that, in the flow path, for example, in its intermediate region, a bluff body is placed within the fluid guided in the flow path for producing vortices, for example, vortices lined up to form a Karman vortex street.

According to a tenth embodiment of the invention, it is, furthermore, provided that the transducer element delivers a sensor signal, which corresponds to a pressure reigning within the fluid guided in the flow path, for example, a variable pressure and/or a pressure subjected at least at times to periodic fluctuations and/or a static pressure, for example, in such a manner that a signal frequency of the sensor signal corresponds to a frequency of periodic fluctuations of a pressure.

According to an eleventh embodiment of the invention, it is, furthermore, provided that the transducer element is arranged in the intermediate region of the flow path, for example, in such a manner that it protrudes, at least partially, inwardly thereinto.

According to a twelfth embodiment of the invention, it is, furthermore, provided that the transducer element delivers a sensor signal, which corresponds to a temperature reigning within the fluid guided in the flow path.

According to a first further development of the invention, the sensor module additionally comprises a heating element for adding heat into the fluid guided in the flow path.

According to a second further development of the invention, the sensor module additionally comprises a jacket affixed, for example, releasably affixed, to the pipeline, for example, a circularly cylindrical jacket, for holding the platform in place within the lumen and/or for accommodating connecting lines connected to the transducer element.

Moreover, the invention resides in a measuring system for ascertaining at least one parameter, for example, a flow velocity and/or a volume flow rate, of a fluid flowing in a pipeline, which measuring system comprises one of the above-described, sensor modules of the invention as well as an electronics module having an electronics housing and a therein accommodated, transmitter electronics, for example, a transmitter electronics electrically connected with the transducer element via connecting lines, for processing the at least one sensor signal produced by the transducer element. Especially, the transmitter electronics electrically coupled with the transducer element is, furthermore, adapted to generate by means of the at least one sensor signal at least one measured value representing the parameter.

A basic idea of the invention is to provide a sensor module for "insertion type" flow measuring devices, especially also "insertion type", vortex, flow measuring devices, wherein the transducer element, with reference to the diameter, respectively the flow cross section, of the flow path, can be provided with a relatively large approach length, without thereby having mentionably to enlarge the installed dimensions of the sensor module in the direction of the central axis of the pipeline guiding the fluid to be measured. This is achieved by features including that the intermediate region of the flow path is oriented perpendicularly to the central axis, consequently in the insertion direction of the sensor module introduced externally into the pipeline, so that almost the entire length of the platform of the sensor module (minus wall regions required for forming the flow path, respectively wall regions stemming from design- and manufacturing concerns) can be utilized for forming the intermediate region of the flow path.

An advantage of the sensor module of the invention, and, thus, a measuring system formed therewith, resides, furthermore, among other things, in the fact that thereby, with platforms relatively short in the direction of the central axis of the pipeline, consequently as seen in the flow direction, and, associated therewith, with an insertion opening of comparatively small inner diameter, a considerable improvement of the accuracy of measurement of measuring systems of the type being discussed can be achieved.

BRIEF DESCRIPTION OF THE DRAWINGS

The invention as well as other advantageous embodiments thereof will now be explained in greater detail based on examples of embodiments presented in the figures of the drawing. Equal parts are provided in all figures with the equal reference characters; when perspicuity requires or it appears otherwise sensible, already mentioned reference characters are omitted in subsequent figures. Other advantageous embodiments or further developments, not least of all also combinations of firstly only individually explained aspects of the invention, will become evident, furthermore, from the figures of the drawing, as well as also from the dependent claims. The figures of the drawing show as follows:

DETAILED DISCUSSION IN CONJUNCTION WITH THE DRAWINGS

Figure 1:
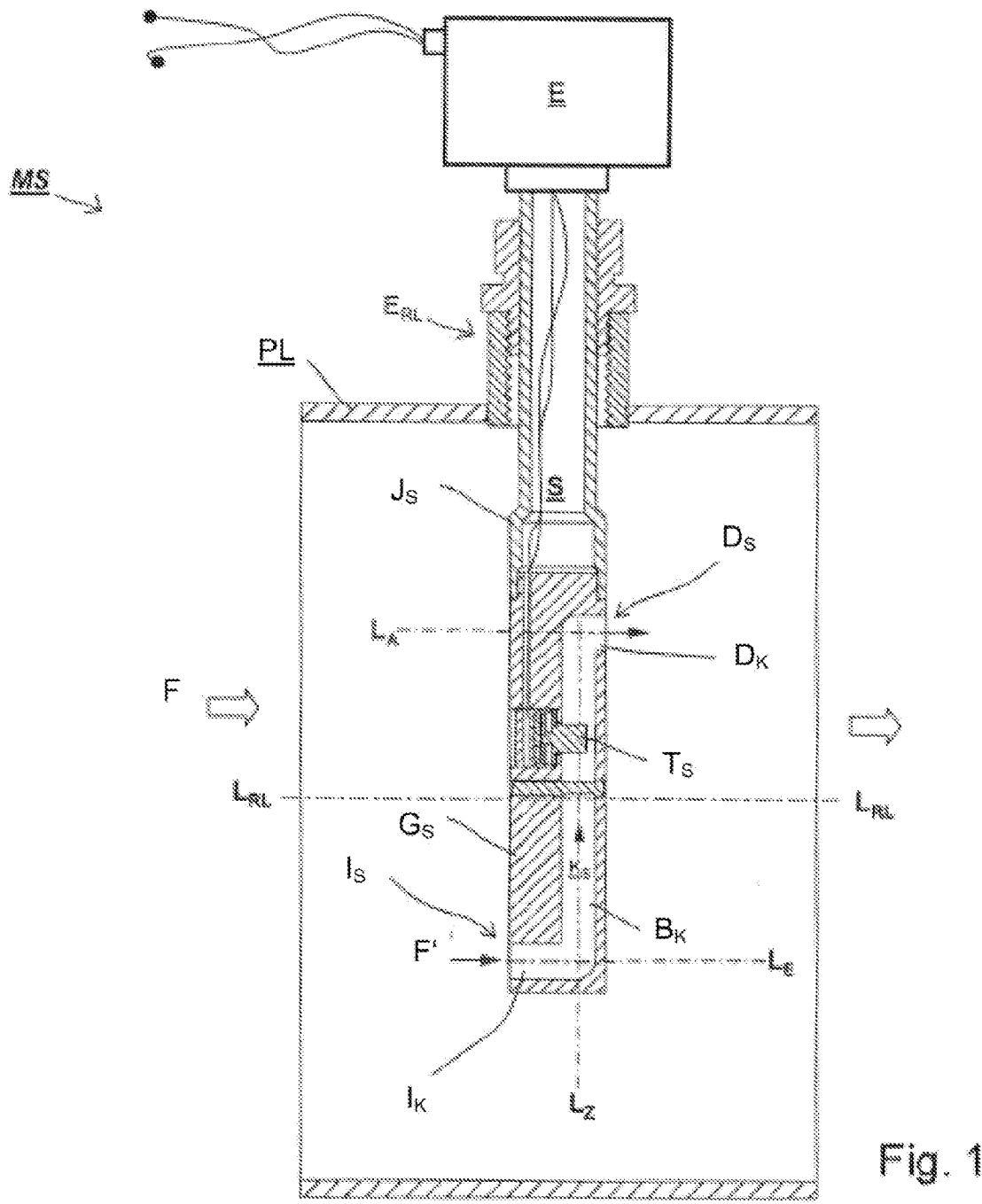
FIG. 1 a pipeline as well as a measuring system in longitudinal section, for measuring at least one parameter of a fluid flowing in the pipeline.

FIG. 1 shows a section of a pipeline serving for guiding flowing fluid and formed, for example, as a plant component of a heat supply system or of a turbine circuit, as well as a measuring system MS having a sensor module S installed in said pipeline and serving for registering at least one parameter, for example, a flow velocity and/or a volume flow rate and/or a mass flow, of a fluid F flowing during operation in the pipeline, as well as an electronics module E connected thereto. Especially, the pipeline is provided to guide a rapidly flowing and/or high pressure and/or hot gas, such as, for instance, saturated steam or superheated steam, while the sensor module of the measuring system is designed, especially, to register parameters of such a fluid, respectively of such a fluid flow.

Figure 2:
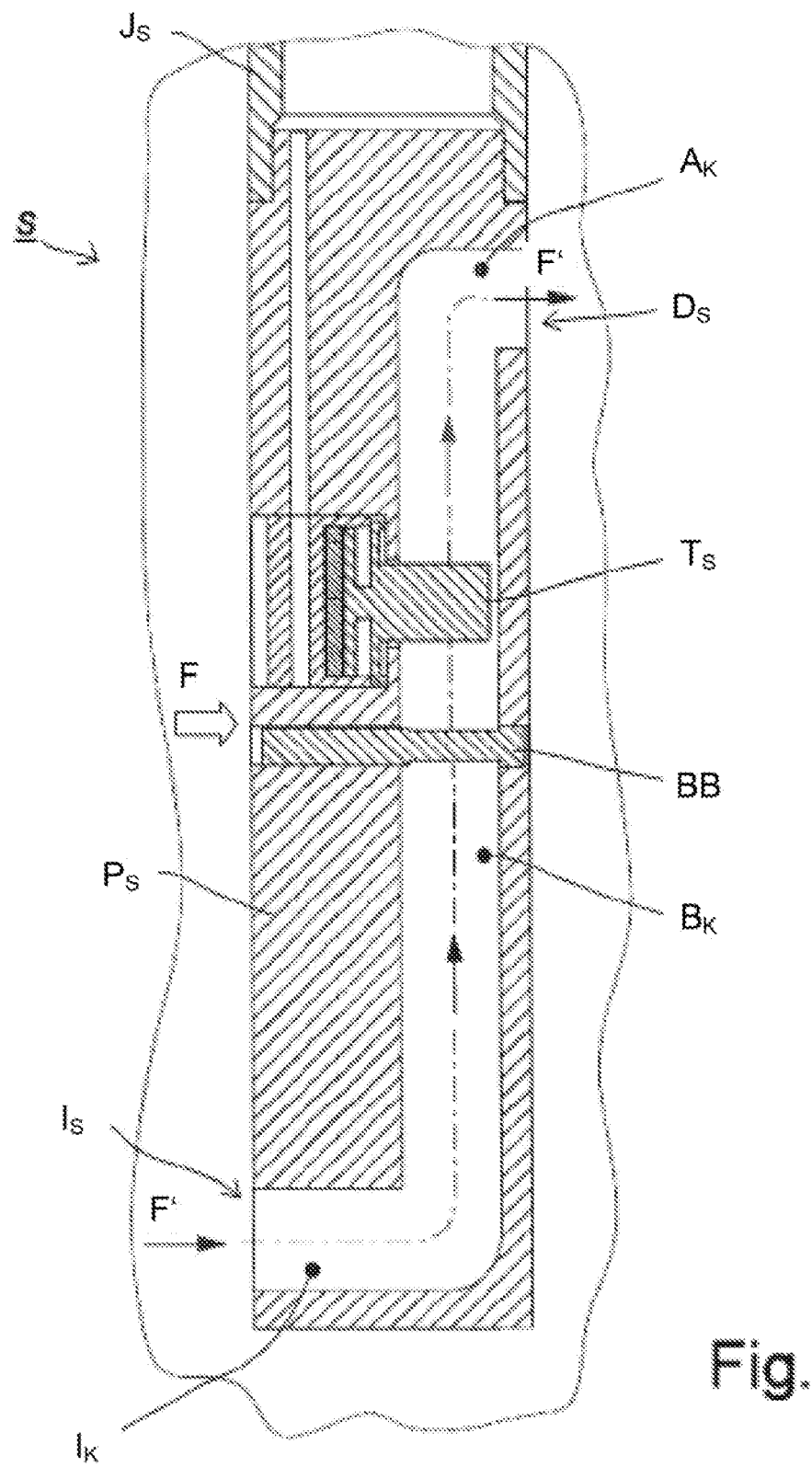
FIG. 2 a sensor module suitable for the measuring system in longitudinal section, of FIG. 1.

The sensor module, of which an enlarged section is shown schematically in FIG. 2, includes a platform $P_S$ placed in a lumen of the pipeline, for example, a prismatoidal or cylindrical platform $P_S$, having a tubular flow path $K_S$ extending therein from an inlet opening $I_S$ to a drain opening $D_S$ remote therefrom and communicating consequently with the lumen of the pipeline for guiding a fluid volume portion, respectively flow portion, F' branched from the fluid flowing in the pipeline.

As evident from FIGS. 1 and 2, the flow path of the sensor module S of the invention is formed by means of an intake region $I_K$ connected with the inlet opening $I_S$, a drain region $D_K$ connected with the drain opening, as well as a straight, intermediate (between) region $B_K$ communicating with the intake region $I_K$ and with the drain region $D_K$. Furthermore, the flow path is, such as directly evident from FIG. 1, respectively FIG. 2, so embodied that it has a largest inner diameter, which is less than a smallest inner diameter of the pipeline; this, especially, such that a diameter ratio, defined by a ratio of the largest inner diameter of the flow path to the smallest inner diameter of the pipeline is less than 0.2, especially less than 0.1. The flow path is, according to an additional embodiment of the invention, also so embodied that an imaginary central axis $L_I$ of the intermediate region $B_K$ is not parallel, for example, it is perpendicular, to an imaginary central axis $L_I$ of the intake region, consequently not parallel, for example, also perpendicular, to an imaginary central axis $L_D$ of the drain region. The inlet region, the drain region, as well as also the intermediate region can, in each case, be so formed that their respective lumens are, at least sectionally, essentially circularly cylindrical. Alternatively or in supplementation, not least of all for the purpose of improving the inlet, respectively drain, flow conditions, the intake region, with base at the intake opening, and/or the drain region, with base at the drain opening, can also be embodied funnel shaped.

The sensor module S of the measuring system of the invention is inserted from the outside through an insertion opening $I_{PL}$, embodied by a nozzle in a wall of a pipeline section PL accommodating the platform, into the lumen of the pipeline and affixed, for example, releasably, to the wall in the region of the insertion opening. Especially, the platform $P_S$ of the sensor module S is shorter than the nominal diameter of the pipeline section accommodating such, especially also shorter than half said nominal diameter, and, consequently, so placed in the lumen that a free end of the sensor module S, thus of the platform $P_S$, has a separation from the region of the pipe section wall diametrally opposite the insertion opening, for example, such that said separation is more than half the nominal diameter of the pipeline section.

The pipeline section PL, which surrounds the lumen accommodating the platform P, should—not least of all for the purpose of providing a sufficiently steady, respectively largely undisturbed, flow profile upstream of the sensor module—be formed as much as possible by means of a uniformly straight (over a distance of more than twice the nominal diameter of the pipeline), consequently internally essentially circularly cylindrically formed, pipe section. In an additional embodiment of the invention, the platform P is so embodied and so placed within the pipeline section PL that the inlet opening has, from an imaginary central axis $L_{PL}$ of said pipeline section, a radial separation, which differs from a radial separation, which the drain opening has from the imaginary central axis $L_{PL}$ of said pipeline section. The inlet opening can, in such case, have, for example, a radial separation from the imaginary central axis of said pipeline section, which is smaller than a radial separation, which the drain opening has from the imaginary central axis $L_{PL}$ of said pipeline section PL.

According to another embodiment of the invention, the platform $P_S$ is, furthermore, so embodied and so oriented relative to the pipeline that an imaginary central axis $L_B$ of the intermediate region of the flow path $K_S$ is not parallel, for example, it is perpendicular, to the imaginary central axis $L_{PL}$ of the aforementioned pipeline section; this, especially, also such that the imaginary central axis of the drain region is parallel to the imaginary central axis $L_{PL}$ said pipeline section. In case required, said imaginary central axis $L_D$ of the drain region can, however, also extend not parallel, for example, also perpendicular, to the imaginary central axis of said pipeline section, consequently the drain region can open into the lumen of the pipeline in the region of the mentioned free end of the sensor module. Alternatively or in supplementation, the imaginary central axis of the intake region can, as schematically shown in FIG. 1, respectively FIG. 2, be oriented parallel to the imaginary central axis of said pipeline section.

The platform, according to an additional advantageous embodiment, is, furthermore, so placed in the lumen of the pipeline that the intake opening faces the fluid flow. For example, the inlet opening can be placed on a first side of the platform flowed perpendicularly against by the fluid and/or on a first side of the platform acting as strike surface for on-flowing fluid.

In an additional embodiment of the invention, the platform is, furthermore, so placed that the drain opening is situated relative to the fluid flow on a side of the platform facing away from the flow, for example, thus arranged on a second side opposite the first side with the intake opening, consequently, on a downstream side. Intake and drain regions can, in advantageous manner, in such case, also be so embodied that the imaginary central axis of the intake region is parallel to the imaginary central axis of the drain region. Alternatively thereto, the intake and drain regions can also be so oriented relative to one another, for example, for the mentioned case, in which the drain region drains into the fluid guiding lumen in the region of the free end of the platform, that the imaginary central axis of the intake region extends, however, not parallel, for example, it is perpendicular, to the imaginary central axis of the drain region.

For producing at least one sensor signal influenced by the fluid flowing in the flow path, the sensor module includes, furthermore, a transducer element $T_S$ arranged on the flow path, here namely also protruding at least partially into such. In especially advantageous manner, the transducer element is, in such case, arranged in the intermediate region of the flow path, for example, thus also such that it at least partially protrudes inwardly into said intermediate region.

Furthermore, the electronics module shown in FIG. 1 comprises a transmitter electronics electrically coupled with the transducer element for processing the at least one sensor signal produced by the transducer element. The transmitter electronics is accommodated in advantageous manner in an electronics housing of the electronics module. The electronics housing is manufactured e.g. of metal and/or synthetic material, for instance a plastic, and is, consequently, sufficiently fluid- and pressure tight. The transmitter electronics is electrically connected with the transducer element via connecting lines. Especially, the transmitter electronics is, furthermore, so adapted that it can during operation, by means of the at least one sensor signal, generate measured values representing the at least one parameter of the flowing fluid to be measured.

In an additional embodiment of the invention, the transducer element is adapted to deliver a sensor signal, which corresponds to a pressure reigning within the fluid guided in the flow path, for example, also a variable pressure and/or a pressure at least at times subjected to periodic fluctuations and/or a static pressure. Particularly for the aforementioned case, in which a pressure reigning within the fluid guided in the flow path is subjected to periodic fluctuations, the transducer element is, especially, also so embodied that the sensor signal delivered therefrom has a signal frequency, which corresponds to a frequency of periodic fluctuations of a pressure, for example, also a pressure which can, at times, even be a static pressure. Alternatively or in supplementation, the transducer element can also be so embodied that it delivers a sensor signal, which corresponds to a temperature reigning within the fluid guided in the flow path. For the purpose of introducing heat into the fluid guided in the flow path for producing a defined heat flux, consequently for effecting a temperature gradient corresponding to a flow velocity of the fluid guided in the flow path, for instance, in the case of application of the measuring system as a thermal, mass flow, measuring device, the sensor module can, furthermore, also include a corresponding heating element.

In an additional embodiment of the invention, the measuring system formed by means of sensor and electronics modules is embodied as a vortex flow measuring device. For this, there is placed in the flow path, namely upstream from the transducer element, a bluff body BB for producing vortices within the fluid guided in the flow path. Also, the bluff body is in advantageous manner arranged in the intermediate region $B_K$ of the flow path $K_S$. Flow path $K_S$ and bluff body BB are, in such case, furthermore, so dimensioned that the vortices produced during operation at least in the case of stationary, or steady, flow are lined up to form a so-called Karman vortex street, not least of all also in the region in which also the transducer element $T_S$ is arranged.

For holding the platform in place within the lumen, the sensor module of an embodiment of the invention includes, furthermore, affixed on the pipeline, a jacket $J_S$, for example, an essentially circularly cylindrical jacket $J_S$. Additionally, as shown schematically in FIG. 1, connecting lines connected to the transducer element $T_S$ for producing electrical connection with the electronics module can be led—protected against external mechanical, respectively thermal, influences—within the jacket, consequently accommodated therein. Serving for securing the jacket can be, for example, a tubular screw connection engaged with the aforementioned nozzle or also a coupling nut engaged with said nozzle.

The invention claimed is:

1. A sensor module for registering at least one parameter, of a fluid flowing in a pipeline, said sensor module comprising:
   a base body placed in a lumen of the pipeline, said base body including a flow path for guiding a fluid volume portion branched from the fluid flowing in the pipeline, said flow path extending within the base body from an inlet opening to a drain opening remote therefrom and communicating with the lumen of the pipeline;
   a transducer element arranged in the flow path, for producing at least one sensor signal influenced by the fluid guided in the flow path; and
   a jacket path affixed releasably to the pipeline for holding the base body in place within the lumen and/or for accommodating connecting lines connected to the transducer element; wherein:
   the flow path includes an intake region connected with the inlet opening, a drain region connected with the drain opening, as well as a straight, intermediate region communicating with the intake region and the drain region, and
   an imaginary central axis of the intermediate region is not parallel, to an imaginary central axis of the intake region and/or it is not parallel, to an imaginary central axis of the drain region.

2. The sensor module as claimed in claim 1, wherein:
   the flow path exhibits a largest inner diameter, which is less than a smallest inner diameter of the pipeline.

3. The sensor module as claimed in claim 2, wherein:
a diameter ratio, defined by a ratio of the largest inner diameter of the flow path to the smallest inner diameter of the pipeline is less than 0.2.

4. The sensor module as claimed in claim 1, wherein:
the imaginary central axis of the intake region is parallel to the imaginary central axis of the drain region.

5. The sensor module as claimed in claim 1, wherein:
the imaginary central axis of the intake region extends not parallel, to the imaginary central axis of the drain region.

6. The sensor module as claimed in claim 1, wherein:
the intake region is funnel shaped; and/or
the drain region is funnel shaped.

7. The sensor module as claimed in claim 1, wherein:
the inlet opening is placed on a first side of said base body, and
the drain opening is placed on a second side of said base body arranged downstream relative to said first side.

8. The sensor module as claimed in claim 1, wherein:
a pipeline section surrounding the lumen accommodating said platform is circularly cylindrical and/or formed by means of a straight tube.

9. The sensor module as claimed in claim 8, wherein:
an imaginary central axis of the intermediate region of the flow path is not parallel, to an imaginary central axis of the said pipeline section.

10. The sensor module as claimed in claim 9, wherein:
the imaginary central axis of the drain region is parallel to the imaginary central axis of said pipeline section.

11. The sensor module as claimed in claim 9, wherein:
the imaginary central axis of the drain region extends not parallel, to the imaginary central axis of said pipeline section.

12. The sensor module as claimed in claim 9, wherein:
the inlet opening has a radial separation from the imaginary central axis of said pipeline section, which is different from a radial separation, which the drain opening exhibits from the imaginary central axis of said pipeline section.

13. The sensor module as claimed in claim 9, wherein:
the inlet opening exhibits a radial separation from the imaginary central axis of said pipeline section, which is smaller than a radial separation, which the drain opening exhibits from the imaginary central axis of said pipeline section; and/or
the imaginary central axis of the intake region is parallel to the imaginary central axis of said pipeline section.

14. The sensor module as claimed in claim 1, wherein the jacket is a circularly cylindrical jacket.

15. The sensor module as claimed in claim 1, wherein:
in the flow path, a bluff body is placed within the fluid guided in the flow path for producing vortices.

16. The sensor module as claimed in claim 1, wherein:
said transducer element delivers a sensor signal, which corresponds to a pressure reigning within the fluid guided in the flow path.

17. The sensor module as claimed in claim 1, wherein:
said transducer element is arranged in the intermediate region of the flow path.

18. The sensor module as claimed in claim 1, wherein:
said transducer element delivers a sensor signal, which corresponds to a temperature reigning within the fluid guided in the flow path.

19. The sensor module as claimed in claim 1, further comprising:
a heating element for adding heat into the fluid guided in the flow path.

20. A measuring system for ascertaining at least one parameter, of a fluid flowing in a pipeline, said measuring system comprising:
a sensor module for registering at least one parameter of a fluid flowing in a pipeline, which sensor module includes: a base body placed in a lumen of the pipeline, said base body including a flow path for guiding a fluid volume portion branched from the fluid flowing in the pipeline,
a jacket affixed released releasably to the pipeline for holding the base body in place within the lumen and/or for accommodating connecting lines connected to the transducer element,
and a transducer element arranged in the flow path, for producing at least one sensor signal influenced by the fluid guided in the flow path,
and a electronics module, which electronics module includes; an electronics housing and, accommodated within said electronics housing, a transmitter electronics for processing the at least one sensor signal produced by said transducer element of the sensor module, wherein:
the flow path extends within the base body from an inlet opening to a drain opening remote therefrom and communicating with the lumen of the pipeline; and
the flow path includes an intake region connected with the inlet opening, a drain region connected with the drain opening, as well as a straight, intermediate region communicating with the intake region and the drain region, and exhibiting an imaginary central axis which is not parallel, to an imaginary central axis of the intake region and/or which is not parallel, to an imaginary central axis of the drain region.

21. The measuring system as claimed in claim 20, wherein:
said transmitter electronics is electrically coupled with said transducer element and is adapted to generate by means of the at least one sensor signal at least one measured value representing the parameter.

22. Sensor module as claimed in claim 1, wherein:
the at least one parameter is at least one of: a flow velocity and a volume flow rate of the fluid.

23. Sensor module as claimed in claim 1, wherein:
the imaginary central axis of the drain region extends is perpendicular to the imaginary central axis of said pipeline section.

24. The sensor module as claimed in claim 1, wherein:
the intake region is perpendicular to the imaginary central axis of the drain region.

25. The sensor module as claimed in claim 1, wherein:
said imaginary central axis of the intermediate region of the flow path is not parallel to an imaginary central axis of the said pipeline section, and the inlet opening exhibits a radial separation from the imaginary central axis of said pipeline section, which is smaller than a radial separation, which the drain opening exhibits from the imaginary central axis of said pipeline section.

26. The sensor module as claimed in claim 7, wherein:
the first side is flowed perpendicularly against by the fluid and/or the first side acting as a strike surface for approaching fluid.

27. The sensor module as claimed in claim 8, wherein:
an imaginary central axis of the intermediate region of the flow path is perpendicular to an imaginary central axis of the said pipeline section.

28. Sensor module as claimed in claim 16, wherein:
a signal frequency of the sensor signal corresponds to a frequency of periodic fluctuations of a pressure.

29. Sensor module as claimed in claim 17, wherein:
the sensor signal delivered by the transducer element corresponds to at least one of: a variable pressure, a pressure subjected at least at times to periodic fluctuations and a static pressure.

30. Sensor module as claimed in claim 17, wherein:
the transducer element is arranged in the intermediate region of the flow path in such a manner that it protrudes, at least partially, inwardly thereinto.

* * * * *